March 13, 1951     G. PETRUCCI     2,545,303
LIQUID DISPENSING APPARATUS
Filed Dec. 6, 1949     4 Sheets-Sheet 1

INVENTOR.
GIUSEPPE PETRUCCI
BY
ATTORNEYS

March 13, 1951 G. PETRUCCI 2,545,303
LIQUID DISPENSING APPARATUS
Filed Dec. 6, 1949 4 Sheets-Sheet 2

INVENTOR.
GIUSEPPE PETRUCCI
BY
ATTORNEYS

March 13, 1951

G. PETRUCCI 2,545,303

LIQUID DISPENSING APPARATUS

Filed Dec. 6, 1949

INVENTOR.
GIUSEPPE PETRUCCI
BY
ATTORNEYS

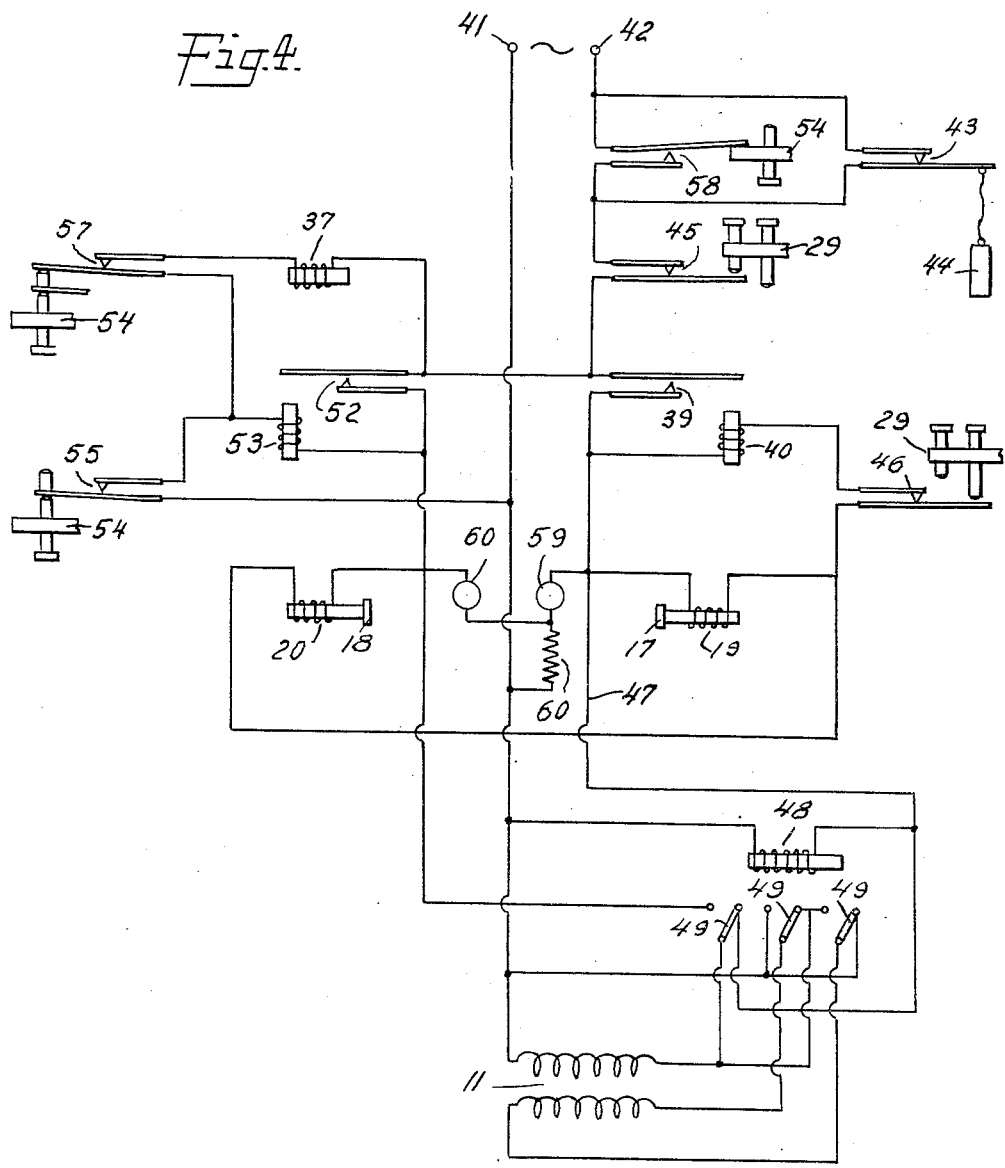

Patented Mar. 13, 1951

2,545,303

UNITED STATES PATENT OFFICE 2,545,303

LIQUID DISPENSING APPARATUS

Giuseppe Petrucci, Caracas, Venezuela

Application December 6, 1949, Serial No. 131,440
In Venezuela September 13, 1949

7 Claims. (Cl. 222—67)

This invention relates to dispensing apparatus and, more specifically, to apparatus for dispensing a measured amount of a liquid from a reservoir thereof to a receiving vessel.

Apparatus for dispensing liquids have generally been restricted to the handling of a liquid of rather restricted specific fluidity. Liquid dispensing devices proposed and constructed heretofore, characterized by the ability to dispense a measured amount of the liquid, have relied largely upon measuring pumps and flow control valves for controlling the amount of liquid dispensed. Both types of quantity-control devices must be designed with particular reference to the fluidity characteristics of the liquid to be dispensed, a device generally suitable for dispensing a very fluid liquid being unsuited to the dispensing of a viscous liquid, and vice versa.

I have now devised a coin-operated apparatus for dispensing a measured amount of a liquid which is adapted to be used with equal effectiveness in the handling of any liquid regardless of its degree of fluidity. This result is achieved in accordance with my invention by utilizing pneumatic forces to withdraw from a reservoir and to discharge to a receiving vessel the desired measured amount of the liquid. The apparatus of my invention comprises a measuring receptacle, pressure control means for alternately establishing a partial vacuum and a pneumatic pressure in the measuring receptacle, liquid communicating means between the reservoir and the measuring receptacle whereby liquid is drawn from the former to the latter when a vacuum is established in the receptacle, and valve means for diverting to the receiving vessel the flow of liquid discharged from the measuring receptacle when a pneumatic pressure is established in the receptacle. Electric control means are further provided for operation of the aforementioned pressure control means. The electric control means is responsive to the amount of liquid in the measuring receptacle and is adapted to alternately establish a partial vacuum and a pneumatic pressure in the receptacle whereby the liquid is first drawn from the reservoir into the receptacle and is subsequently discharged therefrom to the receiving vessel. The measuring receptacle is supported by resilient means adapted to permit vertical displacement of the receptacle upon a change in the combined weight of the receptacle and its contained liquid. The electric control means is responsive to the uppermost and to the lowermost displaced positions of the receptacle corresponding to its empty and filled conditions, respectively. The electric control means responsive to the uppermost displaced position of the receptacle is capable of operating the pressure control means in such manner as to establish and maintain a partial vacuum in the receptacle and thereby cause the liquid to be drawn from the reservoir into the measuring receptacle. The electric control means responsive to the lowermost displaced position of the receptacle is capable of operating the pressure control means so as to terminate the receptacle-filling operation when a predetermined amount of the liquid has been delivered thereto and to establish and maintain a pneumatic pressure in the receptacle and thereby discharge the liquid from the receptacle to the receiving vessel.

These and other novel features of the apparatus of my invention will be more fully understood by reference to the accompanying drawings in which Fig. 1 shows the hydraulic and pneumatic system of my apparatus;

Fig. 4 is a wiring diagram of the electrical circuit which controls operation of the hydraulic and pneumatic system of the apparatus.

The dispensing apparatus of my invention is composed of a hydraulic and pneumatic system for the transportation of the liquid to be dispensed and an electric control system which effects operation of the hydraulic and pneumatic system. The general structure and operation of the apparatus can be most readily understood by a consideration first of the hydraulic and pneumatic system.

Figure 1:
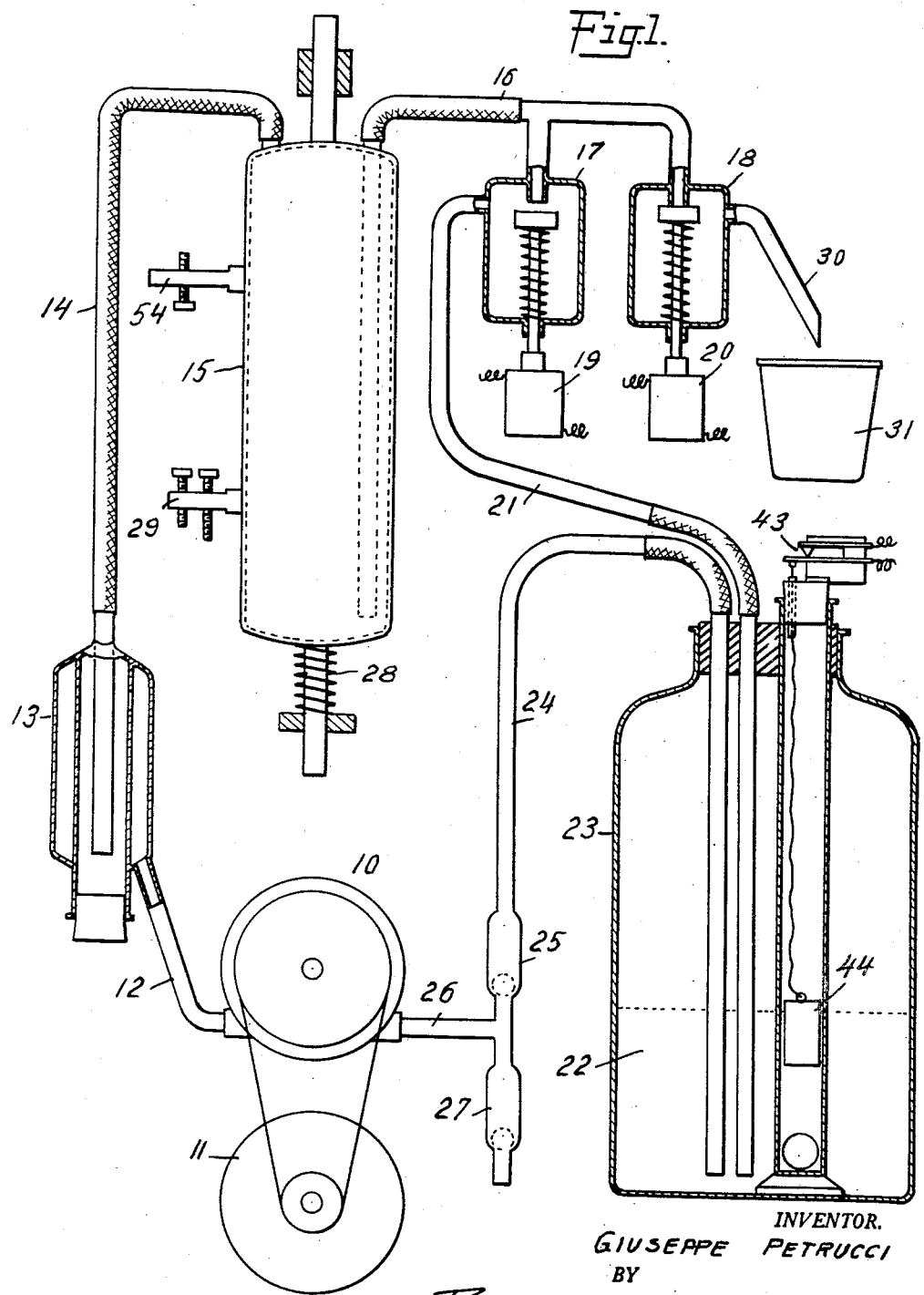

The arrangement of the hydraulic and pneumatic system whereby the liquid to be dispensed is measured and delivered in accordance with my invention is shown in Fig. 1. The liquid is moved through the system by means of a reversible air compressor 10 operated by an electric motor 11. One side of the compressor is connected through a tube 12 to a liquid trap 13 which in turn communicates through a flexible tube 14 with the upper portion of a measuring receptacle 15. A flexible tube 16, projecting inwardly close to the bottom of the receptacle 15, communicates exteriorly thereof with two valves 17 and 18 each spring-held in the closed position and capable of being opened by the energizing of relays 19 and 20, respectively. The valve 17 communicates through a tube 21 to a body of the liquid 22 to be dispensed contained within a reservoir 23. Another tube 24 also communicates between the body of liquid in the reservoir 23, a check valve 25 and tube 26, to the other side of the compressor 10. The tube 26 is connected to the check valve 25 by a T-connection; one side of the T comprising the check valve 25 which permits passage of air through the line 24 only in the direction of the reservoir 23, and the other side of the T comprising a second check valve 27 which permits admission of air into, but not out of the compressor line 26.

The hydraulic and pneumatic system of my dispensing apparatus operates in two distinct phases. The first phase comprises that portion of the operation in which a measured amount of the liquid to be dispensed is separated from the liquid supply reservoir, and the second phase comprises the remaining subsequent portion of the operation in which this measured amount of liquid is delivered to the receiving vessel.

In the first phase of operation of my dispensing apparatus, the motor 11 is operated in such a direction as to cause the compressor 10 to draw air through the tube 14 and to force air through the tube 26. The withdrawal of air through tube 12, the trap 13 and the tube 14 effects evacuation of air from the measuring receptacle 15. The resulting partial vacuum draws the liquid from the body thereof in the reservoir 23 upwardly through the tube 21, through the valve 17 which is held open by the relay 19 for this phase of the operation, and thence through the tube 16 into the measuring receptacle 15. As the liquid accumulates in the measuring receptacle 15, the weight of the receptacle increases and causes the receptacle to settle downwardly against the action of a resilient support such as a compression spring 28 therebeneath. The receptacle 15 is provided near the lower exterior portion thereof with a projecting arm 29 provided with adjustable contact screws adapted to actuate a switch which stops the motor and compressor. The adjustable contact screws are so set with respect to the position of the stopping switch as to actuate the switch when a predetermined amount of liquid has been delivered to the receptacle, as indicated by the downward vertical displacement of the receptacle to a pre-established position. In the course of this first phase of the operation, the air forced by the compressor 10 through the check valve 25 and the tube 24 discharges into the body of liquid in the reservoir 23 so as to effect agitation of the liquid and thereby insure its uniformity of composition in the event that it contains any settleable component.

In the second phase of the operation of my dispensing apparatus, the motor 11 is operated in a reverse direction so that the compressor 10 draws air through the second check valve 27 and discharges this air through the tube 12, the trap 13, and thence through the flexible tube 14 into the upper portion of the measuring receptacle 15. In this second phase of the dispensing operation, the valve relay 19 is de-energized so that valve 17 is closed and the valve relay 20 is energized so that the valve 18 is opened. Consequently, the delivery of air to the upper portion of the measuring receptacle 15 forces the liquid therefrom through the flexible tube 16, the open valve 18, thence through a discharge spout 30 and into the drinking or other receiving vessel 31. It will be seen, accordingly, that the amount of liquid delivered to the receptacle 15 in the first phase of the operation, and automotically measured thereby, is completely discharged in the course of the second phase of the operation so as to dispense a predetermined and measured amount of the liquid into the drinking vessel 31.

Figure 2:
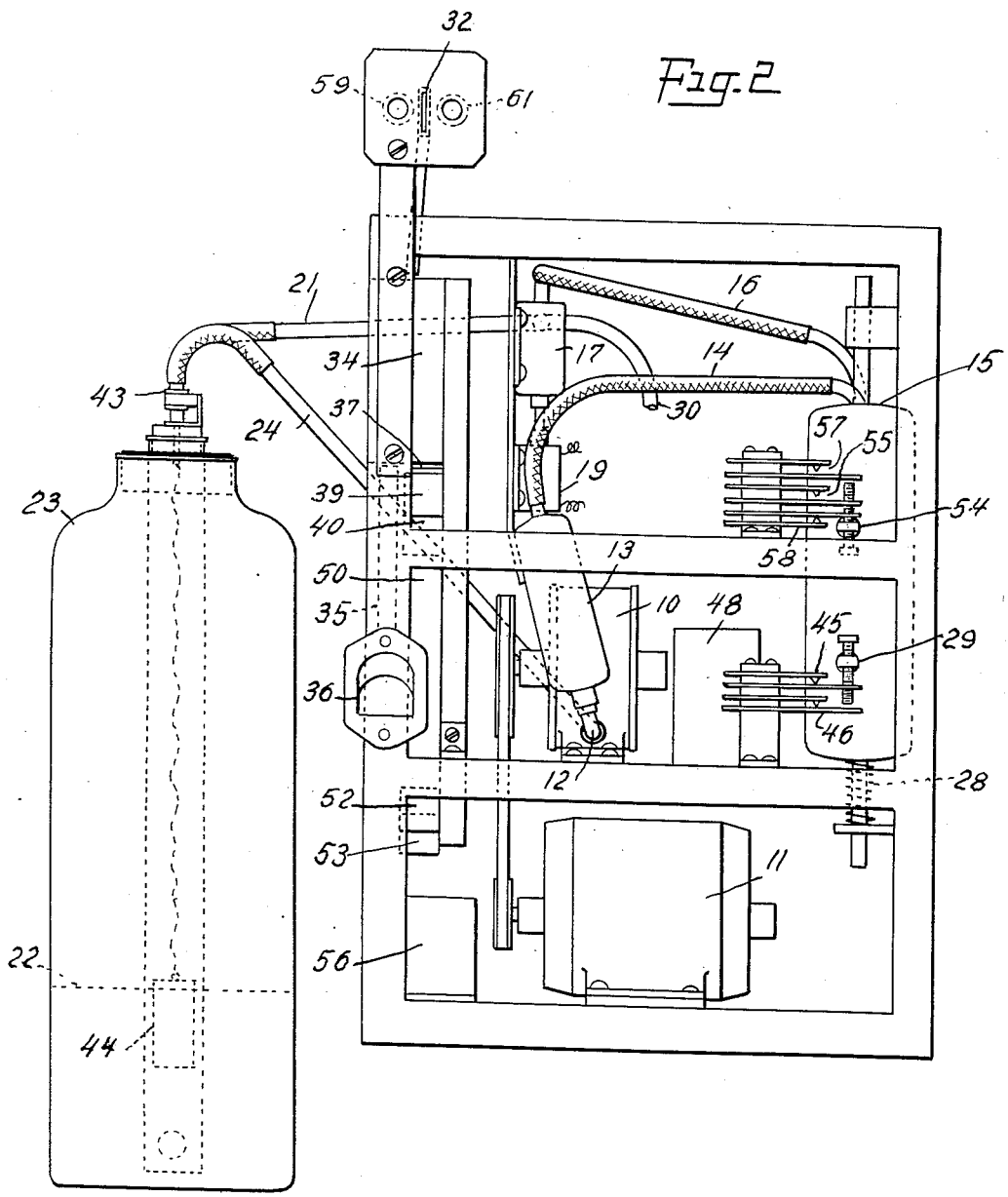
Fig. 2 is a front elevation of the complete apparatus.
Figure 3:
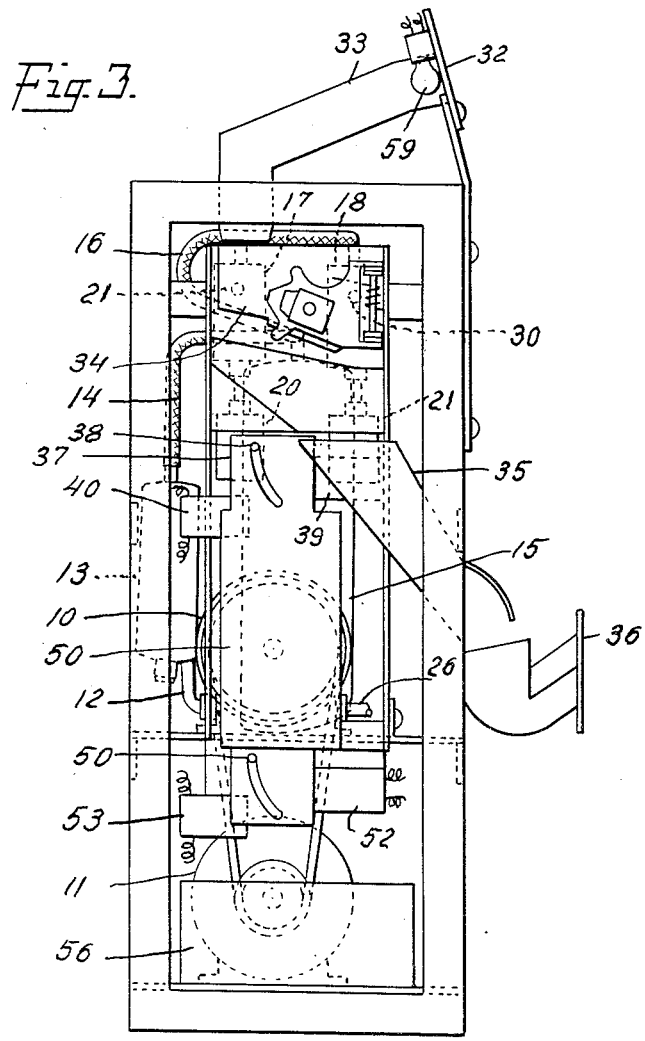
Fig. 3 is a side elevation of the apparatus shown in Fig. 2.

The structural arrangement of the various elements of my dispensing apparatus is shown in Figs. 2 and 3. Operation of the apparatus is initiated by a coin inserted through a coin slot 32 at the top of the device. The coin descends through a delivery channel 33 into a mechanical selector 34 of convenional design. The selector 34 is so constructed as to discard the coin if it is not of the proper size and thus deliver it through a discard chute 35 into a return coin receptacle 36. If the coin is of the proper size, it passes through the mechanical selector and into a relay-operated selector 37 which is held open when energized but which ejects the coin into the discard chute 35 if the selector is de-energized by failure of the power supply. Thus, with a proper size coin under normal operating conditions, the coin passes through both of the selectors 34 and 37 and downwardly against a lever 38 which initiates the operation of the dispensing apparatus for the first phase of its operation. The weight of the coin moves the lever 38 into its operating position to close a starting switch 39, and the coin, lever and switch are each held in their respective positions by a coin-holding relay 40.

The first phase of the operation of my dispensing apparatus will be more readily understood at this point by further reference to the electric control circuit shown in Fig. 4. The power supply line is represented by the terminals 41 and 42. Starting with terminal 42, the current flows through a liquid supply switch 43 normally spring-held in the closed position but opened by the weight of a depending float 44 when the level of the body of liquid 22 in the reservoir 23 descends below an established minimum supply level. The current flows from the switch 43, through a safety switch 45, and thence through the starting switch 39 of that portion of the electric circuit which controls the operation of the apparatus throughout the first phase of its operation.

From the starting switch of the first phase control circuit, the current flows in three paths, one path passing through the coin-holding relay 40, a coin-discharge switch 46 normally held in the closed position, and thence to the other line terminal 41. The second path of the current flowing past the starting switch 39 passes through the relay 19 of the valve 17 and thence to the other line terminal 41. It will be seen that the flow of current through these two paths maintains energization of the relay 40 so as to hold the coin in the position in which it keeps the starting switch 39 closed and further maintains the valve 17 in the open position so as to permit delivery of liquid from the reservoir 23 to the measuring receptacle 15. The third path of the current flowing through the starting switch 39 passes through line 47 to the motor relay 48 and thence back to the other line terminal 41. The resulting energization of the motor relay 48 moves the three blades 49 of the relay into the position indicated in Fig. 4 and effects operation of the motor 11 in such direction as to cause the measuring receptacle 15 to be filled with the liquid to be dispensed.

As the measuring receptacle is progressively filled with the liquid, its increased weight causes it to be displaced downwardly against the action of the spring 28. When the receptacle has been filled with the desired pre-established amount of the liquid, as represented by the level to which the receptacle has settled, the lower side arm 29 of the receptacle makes contact through its adjustable set screws with the projecting blade of the coin-discharge switch 46 and presses downwardly thereon. This action opens the switch 46 so as to de-energize the coin-holding relay 40 and permit the spring action of the relay to discharge the coin with consequent release of the coin-operated lever 38. As a result, the starting switch 39 is opened, and the valve relay circuit, the motor relay circuit and the motor coil circuits are opened. The action of the coin-discharge switch 46 is such as to justify its previous designation herein as the "stopping" switch. With the motor stopped and the valve 17 returned to its closed position, the device is ready for the second phase of its operation. If, for any reason, opening of "stopping" switch 46 fails to stop the motor 11, a slight further downward displacement of the measuring receptacle is sufficient to cause the side arm 29 to open the safety switch 45 and cut off the electric power supply to the entire circuit.

The second phase of the operation is initiated by the coin falling through a conveyor channel 50 and against a second lever 51 which operates a second starting switch 52 in that portion of the electric circuit which controls the second phase of the dispensing operation. The lever 51 is held down, and hence the switch 52 is maintained closed, by the weight of the coin, and the coin is retained in this position by the spring-retracted or de-energized position of a second coin-holding relay 53. When the second starting switch 52 is thus closed, the relay 20 is energized so as to open the valve 18 and the motor coils are again energized. However, the motor relay 48 remains unenergized and the blade 49 of this relay are spring-held against the other contact poles so as to reverse the connections of one of the motor coils. The motor thereupon operates in a direction opposite to that at which it operates in the first phase and causes the compressor 10 to force the liquid out of the measuring receptacle 15, through the open valve 19, thence through the discharge spout 30 and into the drinking vessel 31. As the liquid is discharged from the measuring receptacle 15, the receptacle becomes lightened and is raised by the action of the spring 28. A second receptacle side arm 54 positioned adjacent the upper exterior portion of the receptacle approaches the extending blades of three switches. One of these switches comprises a switch 55 which, when closed, energizes the second coin-holding relay 53. As the upwardly moving side arm 54 closes the switch 55, the relay 53 is energized and operates to discharge the coin from its position in which it holds the second starting switch 52 closed. Consequently, the coin falls downwardly into a receiver 56. The opening of the second starting switch 52 also opens the circuit of the valve relay 20 and the motor coils so as to cause the valve 18 to close and the motor to stop. Discharge of the liquid from the spout 30 thereupon terminates and the full cycle of the dispensing device is completed.

It will be noted that in its final position, the upper receptacle side arm 54 holds relay-operated coin selector switch 57 closed. Inasmuch as both of the switches 55 and 57 are thus maintained closed by the side arm 54 when the measuring receptacle is empty, the relay-operated coin selector 37 is energized so as to permit passage of the next coin through this selector as long as power continues to be applied to the terminals 41 and 42. However, as soon as the first phase of the next operation is commenced, the downward movement of the receptacle and its side arm 54 causes the switches 55 and 57 to open so as to de-energize the selector 37 whereby another coin, if inadvertently inserted into the coin opening before completion of the current operation cycle, will be discarded and returned through the chute 35.

It will also be noted that the upper receptacle side arm 54, at the end of the operating cycle, holds open a switch 58 which is connected in parallel across the float-operated liquid supply switch 43. Thus, in the event that there is sufficient liquid in the reservoir 23 at the beginning of the operating cycle to maintain the liquid supply switch 43 closed but insufficient to maintain switch 43 closed after delivery of only a portion of the desired amount of the liquid to the measuring receptacle 15, the initial downward movement of the measuring receptacle as it is being filled is accompanied by release of the switch 58 so as to by-pass the supply switch 43 and thus permit the device to operate through the remainder of a complete cycle in spite of the opening of the supply switch 43.

As indicated in Fig. 4, the circuit including the first starting switch 39 may be provided with an indicator light 59 connected in series with a resistor 60 to the other line terminal 41 in order to indicate operation of the first phase of the cycle. A similar indicator light 61 is provided in the circuit including the second starting switch 52 in order to indicate operation of the second phase of the cycle. These two indicator lights are advantageously positioned adjacent the coin slot 32 so as to show that the apparatus is in operation as soon as a coin is deposited in the slot.

It will be seen, accordingly, that the dispensing apparatus of my invention is characterized by pneumatic movement of the liquid to be dispensed, both in its delivery from the supply reservoir to the receptacle in which it is measured and in its discharge from the measuring receptacle to the receiving vessel. As a result, the successful operation of the apparatus is not limited to the handling of a liquid of rather critical fluidity. In fact, the apparatus of my invention is capable of dispensing with equal facility liquids ranging in fluidity from the relatively fluid fruit juices to the relatively viscous syrups.

I claim:

1. Apparatus for dispensing a measured amount of a liquid from a reservoir thereof to a receiving vessel which comprises a measuring receptacle, pressure control means for alternately establishing a partial vacuum and a pneumatic pressure in the measuring receptacle, liquid communicating means between the reservoir and the measuring receptacle whereby liquid is drawn from the former to the latter when a vacuum is established in the receptacle, valve means for diverting to the receiving vessel the flow of liquid discharged from the measuring receptacle when a pneumatic pressure is established therein, and electric control means for said pressure control means responsive to the amount of liquid in the measuring receptacle in such manner as to alternately establish a partial vacuum and a penumatic pressure in the receptacle whereby the liquid is first drawn from the reservoir into the receptacle and is subsequently discharged therefrom to the receiving vessel.

2. Apparatus for dispensing a measured amount of a liquid from a reservoir thereof to a receiving vessel which comprises a measuring receptacle, pressure control means for alternately establishing a partial vacuum and a pneumatic pressure in the measuring receptacle, liquid communicating means between the reservoir and the measuring receptacle whereby liquid is drawn from the former to the latter when a vacuum is established in the receptacle, valve means for diverting to the receiving vessel the flow of liquid discharged from the measuring receptacle when a pneumatic pressure is established therein, and electric control means for said pressure control means responsive to the amount of liquid in the measuring receptacle in such manner as to establish a partial vacuum in the receptacle when the latter is empty and maintain said vacuum until the receptacle is filled with the desired amount of liquid and to then establish a pneumatic pressure in the receptacle whereby said amount of liquid is discharged therefrom to the receiving vessel.

3. Apparatus for dispensing a measured amount of a liquid from a reservoir thereof to a receiving vessel which comprises a measuring receptacle adapted to receive the liquid from said reservoir, resilient supporting means for the receptacle adapted to permit vertical displacement of the receptacle upon a change in the combined weight of the receptacle and its contained liquid, pressure control means for alternately establishing a partial vacuum and a pneumatic pressure in the measuring receptacle, liquid communicating means between the reservoir and the measuring receptacle whereby liquid is drawn from the former to the latter when a vacuum is established in the receptacle, valve means for diverting to the receiving vessel the flow of liquid discharged from the measuring receptacle when a pneumatic pressure is established therein, electric control means responsive to the uppermost displaced position of the measuring receptacle when the receptacle is empty capable of operating the pressure control means in such manner as to establish and maintain a partial vacuum in the receptacle, and electric control means responsive to the lowermost displaced position of the measuring receptacle corresponding to filling of the receptacle with the desired measured amount of the liquid capable of operating the pressure control means in such manner as to establish and maintain a pneumatic pressure in the receptacle whereby the liquid is discharged from the receptacle to the receiving vessel.

4. Apparatus for dispensing a measured amount of a liquid from a reservoir thereof to a receiving vessel which comprises a measuring receptacle, pressure control means comprising a reversible pneumatic compressor communicating with the measuring receptacle for alternately establishing therein a partial vacuum and a pneumatic pressure, liquid communicating means between the reservoir and the measuring receptacle whereby liquid is drawn from the former to the latter when a vacuum is established in the receptacle, valve means for diverting to the receiving vessel the flow of liquid discharged from the measuring receptacle when a pneumatic pressure is established therein, and electric control means for said compressor responsive to the amount of liquid in the measuring receptacle in such manner as to operate the compressor in a direction which will establish a partial vacuum in the receptacle when the latter is empty and maintain said vacuum until the receptacle is filled with the desired amount of liquid and to then operate the compressor in the reverse direction and establish a pneumatic pressure in the receptacle whereby said amount of liquid is discharged therefrom to the receiving vessel.

5. Apparatus for dispensing a measured amount of a liquid from a reservoir thereof to a receiving vessel which comprises a measuring receptacle, pressure control means comprising a reversible pneumatic compressor communicating with the measuring receptacle for alternately establishing therein a partial vacuum and a pneumatic pressure, reversible driving means for said compressor, liquid communicating means between the reservoir and the measuring receptacle whereby liquid is drawn from the former to the latter when a vacuum is established in the receptacle, valve means for diverting to the receiving vessel the flow of liquid discharged from the measuring receptacle when a pneumatic pressure is established therein, and electric control means for said driving means responsive to the amount of liquid in the measuring receptacle in such manner as to operate the driving means in such direction as to cause the compressor to establish a partial vacuum in the receptacle when the latter is empty and maintain said vacuum until the receptacle is filled with the desired amount of liquid and to then operate the driving means in the reverse direction so as to cause the compressor to establish a pneumatic pressure in the receptacle whereby said amount of liquid is discharged therefrom to the receiving vessel.

6. Apparatus for dispensing a measured amount of a liquid from a reservoir thereof to a receiving vessel which comprises a measuring receptacle adapted to receive the liquid from said reservoir, resilient supporting means for the receptacle adapted to permit vertical displacement of the receptacle upon a change in the combined weight of the receptacle and its contained liquid, pressure control means comprising a reversible pneumatic compressor communicating with the measuring receptacle for alternately establishing therein a partial vacuum and a pneumatic pressure, reversible driving means for said compressor, liquid communicating means between the reservoir and the measuring receptacle whereby liquid is drawn from the former to the latter when a vacuum is established in the receptacle, valve means for diverting to the receiving vessel the flow of liquid discharged from the measuring receptacle when a pneumatic pressure is established therein, electric control means responsive to the uppermost displaced position of the measuring receptacle when the receptacle is empty capable of operating the driving means in such direction as to cause the compressor to establish and maintain a partial vacuum in the receptacle and thereby cause the liquid to be drawn from the reservoir into the receptacle, and electric control means responsive to the lowermost displaced position of the receptacle when it is filled with the amount of liquid to be dispensed capable of operating the driving means in the reverse direction so as to cause the compressor to establish and maintain a pneumatic pressure in the receptacle and thereby discharge said amount of liquid from the receptacle to the receiving vessel.

7. Apparatus according to claim 6 including a first coin-operated actuating means for the first-mentioned electric control means, a second coin-operated actuating means for the second-mentioned electric control means, both actuating means being operated in response to the presence of a coin of predetermined monetary denomination, coin delivery means adapted to deliver the coin first to the first-mentioned actuating means, and coin delivery means responsive to said lowermost position of the measuring receptacle adapted to deliver the coin to the second-mentioned actuating means.

GIUSEPPE PETRUCCI.

REFERENCES CITED

The following references are of record in the file of this patent:

UNITED STATES PATENTS

| Number | Name | Date |
|---|---|---|
| 2,428,729 | West | Oct. 7, 1947 |